(12) United States Patent
Deguchi et al.

(10) Patent No.: US 8,597,488 B2
(45) Date of Patent: Dec. 3, 2013

(54) METHOD FOR REDUCING CARBON DIOXIDE (75) Inventors: Masahiro Deguchi, Osaka (JP); Yuji Zenitani, Nara (JP); Reiko Taniguchi, Osaka (JP); Satoshi Yotsuhashi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/485,285

(22) Filed: May 31, 2012

(65) Prior Publication Data
US 2012/0234691 A1  Sep. 20, 2012

Related U.S. Application Data (63) Continuation of application No. PCT/JP2011/002069, filed on Apr. 7, 2011.

(30) Foreign Application Priority Data

Apr. 26, 2010 (JP) ................................. 2010-100585

(51) Int. Cl.
*C25B 3/00* (2006.01)
*C25B 1/00* (2006.01)

(52) U.S. Cl.
USPC .......................... 205/440; 205/462; 205/555

(58) Field of Classification Search
USPC .................................. 205/440, 462, 555
See application file for complete search history.

(56) References Cited

U.S. PATENT DOCUMENTS

2007/0193518 A1* 8/2007 Shiina et al. ............... 118/723 R

2008/0058564 A1   3/2008 Iaccino et al.
2010/0187123 A1*  7/2010 Bocarsly et al. ............ 205/340
2011/0143929 A1   6/2011 Sato et al.

FOREIGN PATENT DOCUMENTS

| AR | 055294 A1    | 8/2007  |
| BR | PI0518997-7 A2 | 12/2008 |
| CN | 101124184 A  | 2/2008  |
| JP | 59-168668    | 9/1985  |
| JP | 01-313313    | 12/1989 |
| JP | 04-329888    | 11/1992 |

(Continued)

OTHER PUBLICATIONS

Azuma et al., "Electrochemical Reduction of Carbon Dioxide on Various Metal Electrodes in Low-Temperature Aqueous KHCO3 Media", J. Electrochem. Soc. (Jun. 1990), vol. 137, No. 6, pp. 1772-1778.*

D. Behar et al., "Cobalt Porphyrin Catalyzed Reduction of $CO_2$ Radiation Chemical, Photochemical, and Electrochemical Studies," Journal of Physical Chemistry A, vol. 102, pp. 2870-2877, 1998.

(Continued)

*Primary Examiner* — Edna Wong
(74) *Attorney, Agent, or Firm* — McDermott Will & Emery LLP (57) ABSTRACT

The method for reducing carbon dioxide of the present disclosure includes a step (a) and a step (b) as follows. A step (a) of preparing an electrochemical cell. The electrochemical cell comprises a working electrode, a counter electrode and a vessel. The vessel stores an electrolytic solution. The working electrode contains at least one nitride selected from the group consisting of titanium nitride, zirconium nitride, hafnium nitride, tantalum nitride, molybdenum nitride and iron nitride. The electrolytic solution contains carbon dioxide. The working electrode and the counter electrode are in contact with the electrolytic solution. A step (b) of applying a negative voltage and a positive voltage to the working electrode and the counter electrode, respectively, to reduce the carbon dioxide.

3 Claims, 7 Drawing Sheets

(56) References Cited

FOREIGN PATENT DOCUMENTS

| JP | 07-188961 | | 7/1995 | | |
|---|---|---|---|---|---|
| JP | 2003-275598 | | 9/2003 | | |
| JP | 2005-063677 | | 3/2005 | | |
| JP | 2005063677 A | * | 3/2005 | ............. | H01M 4/90 |
| JP | 2006-198570 | | 8/2006 | | |
| JP | 2008-525448 | | 7/2008 | | |
| JP | 4167775 | | 10/2008 | | |
| JP | 2009-238685 | | 10/2009 | | |
| JP | 2010-064066 | | 3/2010 | | |
| NO | 20073741 A | | 9/2007 | | |
| WO | WO 2005089031 A1 | * | 9/2005 | ............. | H05H 1/50 |
| WO | WO 2006/068800 A2 | | 6/2006 | | |
| WO | WO 2010/018871 A1 | | 2/2010 | | |
| WO | WO 2010013244 A2 | * | 2/2010 | ................ | C25B 1/04 |

OTHER PUBLICATIONS

Manfred Rudolph et al., "Macrocyclic [$N_4^2$] Coordinated Nickel Complexes as Catalysts for the Formation of Oxalate by Electrochemical Reduction of Carbon Dioxide," Journal of American Chemical Society, vol. 122, pp. 10821-10830, 2000.

Yoshio Hori et al., "Production of CO and $CH_4$ in Electrochemical Reduction of $CO_2$ at Metal Electrodes in Aqueous Hydrogencarbonate Solution," Chemistry Letters, pp. 1695-1698, 1985.

B. Hammer et al., "CO Chemisorption at Metal Surfaces and Overlayers," Physical Review Letters, vol. 76, No. 12, pp. 2141, 1996.

Yoshio Hori et al., "Formation of Hydrocarbons in the Electrochemical Reduction of Carbon Dioxide at a Copper Electrode in Aqueous Solution," Journal of Chemical Society, Faraday Transactionsl, vol. 85, Issue 8, pp. 2309-2326, 1989.

International Search Report issued in International Patent Application No. PCT/JP2011/002069, mailed May 17, 2011.

* cited by examiner

METHOD FOR REDUCING CARBON DIOXIDE

This is a continuation of International Application No. PCT/JP2011/002069, with an international filing date of Apr. 7, 2011, which claims the foreign priority of Japanese Patent Application No. 2010-100585, filed on Apr. 26, 2010, the entire contents of both of which are hereby incorporated by reference.

BACKGROUND OF THE INVENTION

1. Field of the Invention

The present disclosure relates to a method for reducing carbon dioxide.

2. Description of Related Art

A carbon dioxide ($CO_2$) reduction technique using a catalyst is expected as a technique for fixing $CO_2$ and producing useful substances. The reduction technique is one of the important means for solving the problem of greenhouse gas-induced global warming believed to be significant in the future. As the $CO_2$ reduction techniques using a catalyst, a catalytic hydrogenation method and an electrochemical method (electrolytic reduction method) have been studied so far. In the catalytic hydrogenation method, $CO_2$ reacts catalytically with hydrogen ($H_2$) to be reduced under a high temperature and high pressure gas phase condition. The catalytic hydrogenation method allows $CO_2$ to be converted into highly useful substances such as methanol (JP 4167775 B and JP 1(1989)-313313 A).

In the electrolytic reduction method, the reducing reaction proceeds even at an ordinary temperature and ordinary pressure. The electrolytic reduction method requires no large-scale equipment. Thus, the electrolytic reduction method is simpler than the catalytic hydrogenation method. Accordingly, the electrolytic reduction method is considered as an effective $CO_2$ reduction method. As catalysts capable of reducing $CO_2$ by the electrolytic reduction method, metals such as copper (Cu) and silver (Ag), alloy materials of these, and complex materials (molecular catalysts) such as a cobalt (Co) complex, a nickel (Ni) complex and an iron (Fe) complex have been developed so far (Journal of Physical Chemistry A Vol. 102 p. 2870 (1998), Journal of American Chemical Society Vol. 122 p. 10821 (2000), and Chemistry Letters p. 1695 (1985)).

SUMMARY OF THE INVENTION

Generally, $CO_2$ is a very stable molecule. Thus, the $CO_2$ reduction treatment by the catalytic hydrogenation method requires a high temperature (a heating temperature of 300° C.) and a high pressure (a reaction pressure of 50 atmospheres) for a reaction proceeding. Furthermore, the catalytic hydrogenation method uses a flammable gas such as $H_2$. For these reasons, the catalytic hydrogenation method requires to install large-scale equipment. The catalytic hydrogenation method has a problem in that a great deal of energy must be input into the reduction treatment and in that the energy utilization efficiency is very low.

Moreover, the metals, the alloy materials, and the molecular materials used as catalysts in the electrolytic reduction method have a durability problem in that they deteriorate severely with time during the long-time catalytic reaction. Thus, a catalyst that is capable of reducing $CO_2$ by the electrolytic reduction method and has high practicability has not been found yet.

One non-limiting and exemplary embodiment provides a method for reducing carbon dioxide using a highly-durable catalyst that is capable of reducing $CO_2$ at an overvoltage equal to or lower than overvoltages for conventional catalysts to produce highly useful substances (such as formic acid (HCOOH), methane ($CH_4$), ethylene ($C_2H_4$) and ethane ($C_2H_6$)).

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature a method for reducing carbon dioxide, the method including:
 a step (a) of preparing an electrochemical cell, wherein
 the electrochemical cell comprises a working electrode, a counter electrode and a vessel,
 the vessel stores an electrolytic solution,
 the working electrode contains at least one nitride selected from the group consisting of titanium nitride, zirconium nitride, hafnium nitride, tantalum nitride, molybdenum nitride and iron nitride,
 the electrolytic solution contains carbon dioxide,
 the working electrode is in contact with the electrolytic solution, and
 the counter electrode is in contact with the electrolytic solution; and
 a step (b) of applying a negative voltage and a positive voltage to the working electrode and the counter electrode, respectively, to reduce the carbon dioxide.

The electrochemical cell is used in the method for reducing carbon dioxide of the present disclosure. The electrochemical cell comprises the working electrode for reducing carbon dioxide. The working electrode contains at least one nitride selected from the group consisting of titanium nitride, zirconium nitride, hafnium nitride, tantalum nitride, molybdenum nitride and iron nitride. These nitrides are capable of reducing carbon dioxide at an overvoltage equal to or lower than overvoltages for conventional catalysts for reducing carbon dioxide. Therefore, the method of the present disclosure makes it possible to produce highly useful substances, such as HCOOH, $CH_4$, $C_2H_4$ and $C_2H_6$, at an overvoltage equal to or lower than overvoltages in conventional methods. Furthermore, the high durability of the nitrides allows the working electrode to achieve high durability.

DETAILED DESCRIPTION

Hereinafter, the method for reducing carbon dioxide according to the present disclosure will be described with reference to the drawings.

The method for reducing carbon dioxide ($CO_2$) of the present disclosure is a method for reducing $CO_2$ electrochemically. In the method of the present disclosure, an electrochemical cell is prepared first. The electrochemical cell comprises an electrode (working electrode) used to reduce $CO_2$. The working electrode contains at least one nitride selected from the group consisting of titanium nitride (TiN), zirconium nitride (ZrN), hafnium nitride (HfN), tantalum nitride (TaN), molybdenum nitride (at least one selected from MoN and $Mo_2N$), and iron nitride (at least one selected from $Fe_2N$ and $Fe_4N$). The following is an example of using tantalum nitride for the working electrode.

Tantalum nitride particles (TaN particles) obtained by nitridation are dispersed in an organic solvent to prepare a slurry solution. The TaN particles have an average particle diameter of about several micrometers. Then, an appropriate amount of the slurry solution is applied to a conductive carbon paper (CP) that has carbon fibers woven therein and is to be used as an electrode substrate. Thus, a working electrode (catalyst) in which the TaN particles are supported on the CP is fabricated. The CP is porous. Therefore, it is difficult to specify clearly the amount of the supported TaN particles. However, the amount of TaN particles supported is about several tens of micrograms/$cm^2$ to 1 milligram/$cm^2$. The electrode substrate is not limited to the CP as long as it has conductivity. For example, an inert metal substrate such as a gold (Au) substrate, a glassy carbon substrate, and a conductive silicon substrate are commonly used besides the CP. Furthermore, the manufacturing method and shape of the TaN particles are not limited, either. For example, TaN having a shape of a thin film may be used instead of the TaN particles mentioned above. Even in the case of using an electrode structure in which TaN having a shape of a thin film is deposited on the surface of the conductive substrate by a method such as sputtering, it is possible to obtain the same catalytic activity as in the case of using the electrode structure in which the TaN particles are supported on the surface of the conductive substrate. Such an electrode production method may cause impurities to enter into the electrode during the production process. However, the catalytic activity occurs depending on the type of the compound used as a catalyst. Therefore, the impurities which have entered into the electrode during the production process do not affect the consequence of the catalytic activity of the compound.

The configuration of the catalyst for reducing $CO_2$ containing TaN is exemplified above. However, as indicated in Examples below, a catalyst sample in which titanium nitride (TiN) particles are supported instead of the tantalum nitride particles, a catalyst sample in which zirconium nitride (ZrN) particles are supported instead of the tantalum nitride particles, a catalyst sample in which hafnium nitride (HfN) particles are supported instead of the tantalum nitride particles, a catalyst sample in which molybdenum nitride (MoN and $Mo_2N$) particles are supported instead of the tantalum nitride particles, and a catalyst sample in which iron nitride ($Fe_2N$ or $Fe_4N$) particles are supported instead of the tantalum nitride particles are confirmed to be effective as catalysts for reducing $CO_2$.

As described above, the electrode substrate, the shape of the nitride supported on the substrate, etc. are diverse. However, in the actual reduction treatment of carbon dioxide, an electrolytic reaction in an electrolytic solution, etc. or an electrolytic reaction utilizing a gas diffusion electrode is carried out. Therefore, the supporting and deposition methods are adjusted to be suitable for the nitride so that the nitride can be stably supported or deposited on the substrate. Next will be described the result of analytic evaluation on substances produced when $CO_2$ is subject to the electrochemical treatment using the working electrode containing the TaN particles. The substances produced by the $CO_2$ reduction using the working electrode include a gas component and a liquid component. In the present embodiment, gas chromatograph is used for analyzing the gas components and liquid chromatograph is used for analyzing the liquid components. As a result, it can be confirmed that $CO_2$ is reduced to produce HCOOH, $CH_4$, $C_2H_4$ and $C_2H_6$. The theoretical background of finding these is as follows.

Figure 1:
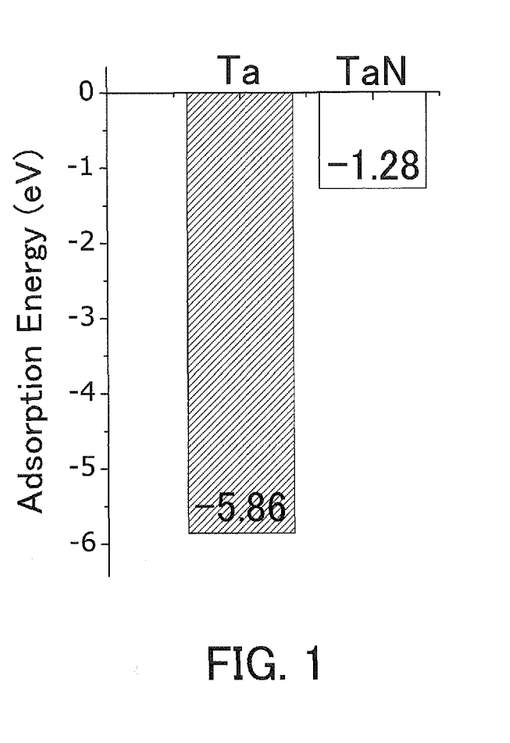
FIG. 1 is a graph showing a comparison between an adsorption energy of carbon monoxide (CO) on a surface of metal tantalum (Ta) and an adsorption energy of carbon monoxide (CO) on a surface of tantalum nitride (TaN).

FIG. 1 shows adsorption energy ($E_a$) of CO on a surface of metal tantalum (Ta) and a surface of tantalum nitride (TaN) estimated from simulations (electronic state calculations) based on density functional theory. Generally, in order to cause effectively a catalytic reaction on a surface of a solid matter, it is desirable for the solid matter to have an appropriate magnitude of $E_a$ value. For example, an excessively large $E_a$ value strengthens the absorption of molecules on the surface of the solid matter, thereby stabilizing the molecules on the surface of the solid matter. This makes it difficult for a reaction to occur, reducing the possibility of the catalytic reaction occurring. In contrast, an excessively small $E_a$ value lowers the probability of the molecules being present on the surface of the solid matter. This also reduces the possibility of the catalytic reaction occurring, which is not desirable. It is known, for example, that metal copper (Cu) causes a reducing reaction of $CO_2$ relatively effectively. It is reported that the $E_a$ value of CO on a surface of Cu is about –0.62 eV (B. Hammer et al., Physical Review Letter Vol. 76 p. 2141 (1996)).

From this viewpoint, a comparison is made between the metal Ta and the tantalum nitride (TaN). As shown in FIG. 1, the $E_a$ value of CO on the metal Ta, which is not a compound, is as large as –5.86 eV. Thus, in the case of using the metal Ta as the working electrode, CO is absorbed strongly on the surface of the metal Ta, and it is presumed accordingly that a catalytic reaction hardly proceeds. In contrast, when Ta is nitrided as in the present disclosure, the $E_a$ value of CO is lowered to about 1.3 eV. Moreover, a similar calculation confirms that an adsorption structure is obtained on the surface of TaN at a relatively small energy also in the case of $CO_2$ adsorption. Thus, it is conceived that neither the adsorption of CO on the surface of TaN nor the adsorption of $CO_2$ on the surface of TaN are too strong and a catalytic reaction occurs very easily.

In a common electrolytic reduction process of $CO_2$, $CO_2$ present near a surface of an electrode is reduced by a reaction between electrons injected from the electrode and protons in a solution. As a result, HCOOH is produced. Moreover, part of $CO_2$ is reduced to weakly-adsorbed CO by the reaction between the electrons injected from the electrode and the protons, and the weakly-adsorbed CO further is subject to the reaction between the electrons injected and the protons. As a result, hydrocarbon, such as $CH_4$, conceivably is produced (Y. Hori et al., Journal of Chemical Society, Faraday Transaction 1 Vol. 85 p. 2309 (1989)). In view of this, it is conceived that the above-mentioned reactions proceed also with $CO_2$ adsorbed on TaN. As a result, HCOOH, $CH_4$, $C_2H_4$ and $C_2H_6$ conceivably are produced.

On the other hand, the same calculation was made with respect to a surface of Cu. As a result, the adsorption energy of $CO_2$ on the surface of Cu was almost 0. That is, a stable $CO_2$ adsorption structure is hardly obtained on the surface of Cu. It is known that in a common reducing reaction process of $CO_2$, a high overvoltage is needed in a process in which one electron moves to a $CO_2$ molecule and then the $CO_2$ molecule is adsorbed on a surface of a catalyst. Thus, in case of a catalyst containing Cu on which $CO_2$ is not adsorbed stably, a high overvoltage is needed in the process in which $CO_2$ is adsorbed on the surface of the catalyst. In contrast, in the case of metal nitrides (TaN, TiN, ZrN, HfN, MoN, $Mo_2N$, $Fe_2N$ and $Fe_4N$) used in the method for reducing $CO_2$ of the present disclosure, $CO_2$ can be adsorbed on the solid surfaces of the metal nitrides at a small adsorption energy as described above. This indicates that the above-mentioned nitrides are capable of lowering the overvoltage for reducing $CO_2$.

By exemplifying Ta as a metal element, the principle of the catalytic reaction in reducing $CO_2$ is explained above. Presumably, the molecule adsorption process and the catalytic reaction process described above are the same for the other metal nitrides selected as the catalysts for reducing $CO_2$ in the present disclosure.

The above-mentioned nitrides used as catalysts in reducing $CO_2$ allows $CO_2$ to be reduced with an external energy from DC power supply at ordinary temperature. Moreover, the method for reducing $CO_2$ of the present disclosure can be applied to methods using a solar cell as an external power supply. The catalysts for reducing $CO_2$ can be applied, by combination with a photocatalyst, to catalysts that can be used with solar energy.

The method for reducing $CO_2$ using the nitrides is very simple because it can be carried out by blowing $CO_2$ gas into an electrolytic solution or by forming a three-phase boundary with a gas diffusion electrode. Thus, it can be said that the method for reducing $CO_2$ using the nitrides is a very promising technique as an energy-saving measure for $CO_2$ in places where large-scale equipment cannot be installed in houses and communities.

Figure 2:
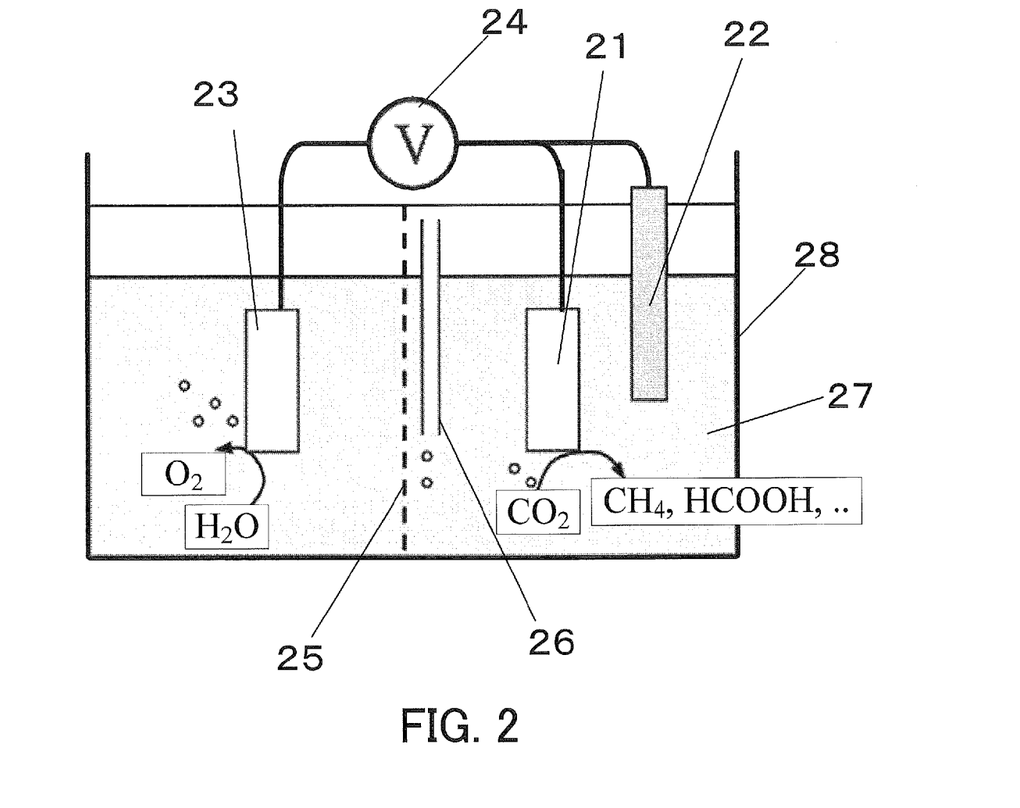
FIG. 2 is a structural drawing of an electrochemical cell used for measurements in the present disclosure.

Next, an example of the electrochemical cell used in the method for reducing $CO_2$ of the present disclosure will be described. An electrochemical cell having the same configuration as that of a cell (see FIG. 2) used in Examples below will be exemplified. That is, as shown in FIG. 2, the electrochemical cell of the present embodiment comprises a working electrode 21, a counter electrode 23 and a vessel 28. This vessel 28 stores an electrolytic solution 27. The working electrode 21 and the counter electrode 23 are electrically connected to each other and in contact with the electrolytic solution 27. The electrolytic solution 27 contains $CO_2$. The vessel 28 comprises a solid electrolyte membrane (for example, cation exchange membrane) 25. The solid electrolyte membrane 25 is disposed between the working electrode 21 and the counter electrode 23. The solid electrolyte membrane 25 separates the vessel 28 into a region of the working electrode 21 and a region of the counter electrode 23. The electrochemical cell comprises further a gas introduction tube 26 that functions as a gas inlet. One end of the gas introduction tube 26 is disposed in the electrolytic solution 27. In the case of reducing $CO_2$ using this electrochemical cell, performed is the step of applying a negative voltage and a positive voltage to the working electrode 21 and the counter electrode 23, respectively. In this step, $CO_2$ is supplied to the electrolytic solution 27 through the gas introduction tube 26, for example. The working electrode 21 contains at least one selected from the group consisting of titanium nitride (TiN), zirconium nitride (ZrN), hafnium nitride (HfN), tantalum nitride (TaN), molybdenum nitride (at least one selected from MoN and $Mo_2N$), and iron nitride (at least one selected from $Fe_2N$ and $Fe_4N$). In FIG. 2, the working electrode 21 and the counter electrode 23 are completely immersed in the electrolytic solution 27. However, the placement of the working electrode 21 and the counter electrode 23 are not limited to this. The working electrode 21 and the counter electrode 23 is placed in contact with the electrolytic solution 27. The electrochemical cell shown in FIG. 2 is a three-electrode cell provided further with a reference electrode 22 for the measurements in Examples. However, the reference electrode 22 is not necessary to be provided, because it is not essential to measure the potential when the electrochemical cell is used for reducing $CO_2$. An example of the material for the counter electrode 23 is metal such as platinum and nickel, and metal oxide such as $Cr_2O_3$. By selecting a material that has a low overvoltage in an oxygen evolution reaction that occurs on the counter electrode 23, it is possible to reduce carbon dioxide at a lower applied voltage.

The method for reducing $CO_2$ of the present disclosure can be carried out using the cell shown in FIG. 2. In this method, an electrochemical cell as shown in FIG. 2 is prepared first. Subsequently, a negative voltage and a positive voltage are applied to the working electrode 21 and the counter electrode 23, respectively. For example, the absolute value of a potential difference is 2.0 V or more. Through these steps, $CO_2$ contained in the electrolytic solution 27 is reduced and thereby highly useful substances can be produced.

From the disclosure above, the following exemplary embodiments further are achieved.

An electrode used to reduce carbon dioxide, the electrode containing at least one nitride selected from the group consisting of titanium nitride, zirconium nitride, hafnium nitride, tantalum nitride, molybdenum nitride and iron nitride.

A catalyst for reducing carbon dioxide, the catalyst containing at least one nitride selected from the group consisting of titanium nitride, zirconium nitride, hafnium nitride, tantalum nitride, molybdenum nitride and iron nitride.

EXAMPLES

In the following examples, the catalyst for reducing $CO_2$ of the present disclosure will be described in further detail.

Example 1

A conductive carbon paper (CP) with a thickness of 0.3 mm was prepared as an electrode substrate. Tantalum nitride particles having an average particle diameter of 1 μm (TaN particles with a purity of 99.9%) were supported on the CP at a distribution density of about $1 \times 10^7$ particles/$cm^2$. Thus, the catalyst of the present example was produced. An electrochemical reducing reaction of $CO_2$ was carried out using this catalyst. FIG. 2 shows a schematic view illustrating the structure of an electrochemical cell used for the measurements in this example. The electrochemical cell was a three-electrode cell provided with the working electrode 21, the reference electrode 22 and the counter electrode 23. In this cell, the catalyst produced according to the present example was used in the working electrode 21. A silver/silver chloride electrode (Ag/AgCl electrode) was used as the reference electrode 22. A platinum electrode (Pt electrode) was used as the counter electrode 23. The electric potential applied to the three electrodes was swept by using potensiostat 24, and the reducing reaction of $CO_2$ was performed and evaluated. As the electrolytic solution 27, 0.1 M (0.1 mol/L) potassium bicarbonate aqueous solution ($KHCO_3$ aqueous solution) was used. The working electrode 21 and the counter electrode 23 were partitioned off with the solid electrolyte membrane 25 to prevent gas components produced by the catalytic activity from mixing with each other. $CO_2$ gas was bubbled into the electrolytic solution 27 through the gas introduction tube 26 disposed in the cell so as to be introduced into the electrolytic solution 27.

The measurement was made as follows.

(1) First, nitrogen ($N_2$) gas was flowed into the electrolytic solution 27 at a flow rate of 200 ml/min for 30 minutes. In the state in which $CO_2$ was excluded from the solution, the electric potential was swept and a curve of reaction electric current-electrolytic potential (C-V curve) was measured.

(2) Next, the tube was switched from nitrogen gas to $CO_2$ gas. $CO_2$ gas also was flowed similarly into the electrolytic solution 27 at a flow rate of 200 ml/min for 30 minutes. In the state in which the electrolytic solution 27 was saturated with $CO_2$, the electric potential was swept and the C-V curve under the presence of $CO_2$ was measured.

Figure 3:
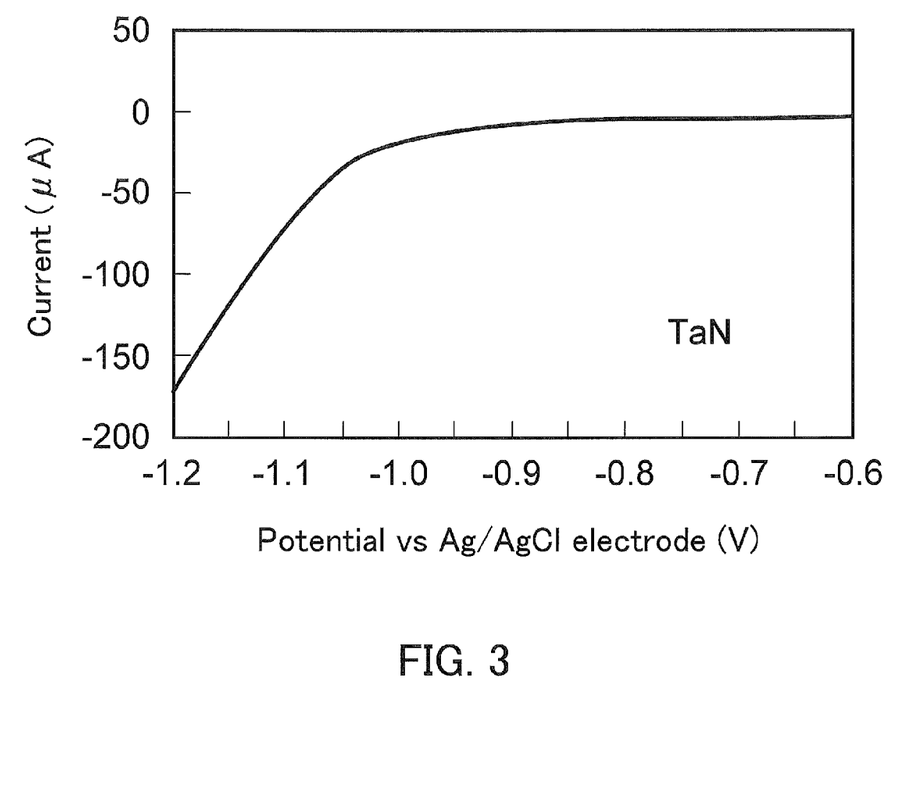
FIG. 3 is a graph showing the result of a reaction current-electrolytic potential measurement (C-V measurement) in the case of using tantalum nitride (TaN).

The difference between the C-V curve obtained in the state (1) (the state in which $CO_2$ was excluded from the electrolytic solution 27) and the C-V curve obtained in the state (2) (the state in which the electrolytic solution 27 was saturated with $CO_2$) was calculated. Based on this difference, a reaction current (hereinafter referred to as a reducing current) produced by the reduction of $CO_2$ was evaluated. FIG. 3 shows the results thereof. In this figure, when the current value (vertical axis) is negative, it indicates that the reducing reaction of $CO_2$ has occurred. As shown in FIG. 3, the experiment in the present example shows that the reaction current fell from zero to a negative value where the potential E with respect to that of the silver/silver chloride electrode (Ag/AgCl electrode) was about −0.9 V. That is, in the case of the catalyst containing TaN particles, a reducing current of $CO_2$ was observed when the applied voltage was about −0.9 V with respect to that of the silver/silver chloride electrode (Ag/AgCl electrode). This means that the reduction starts when the applied voltage is about −0.7 V with respect to a standard hydrogen electrode. On the other hand, the $CO_2$ reduction experiment was performed on a catalyst containing single Cu instead of TaN by using this measurement system. As a result, an applied voltage higher than −1.1 V was necessary to cause the reducing reaction of $CO_2$. This result indicates that TaN is effective in lowering the overvoltage for reducing $CO_2$.

Subsequently, the products of the reducing reaction of $CO_2$ in the case of using the catalyst containing TaN particles were analyzed. Gas components were analyzed using a gas chromatograph equipped with a hydrogen flame ionization detector (FID). Liquid components were analyzed using a UV detection type liquid chromatograph.

Figure 4:
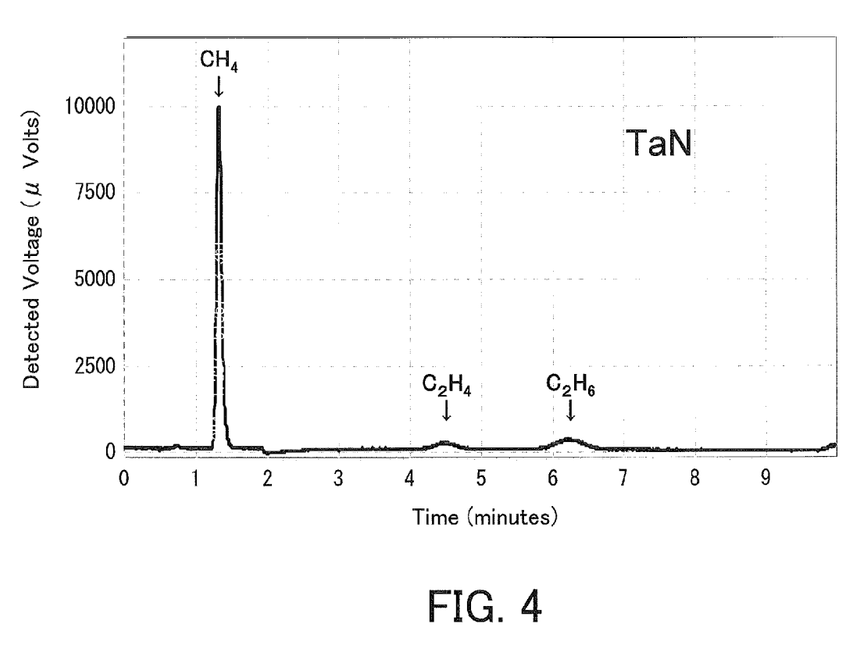
FIG. 4 is a graph showing the result of a gas chromatographic analysis indicating the production of methane ($CH_4$), ethylene ($C_2H_4$), and ethane ($C_2H_6$) in the case of using tantalum nitride (TaN).
Figure 5:
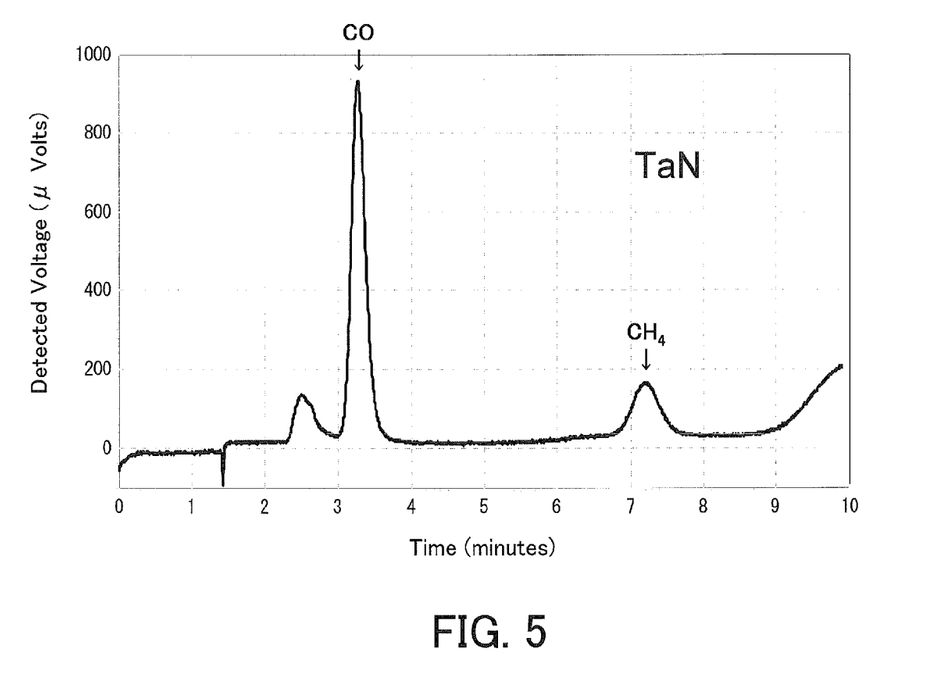
FIG. 5 is a graph showing the result of a gas chromatographic analysis indicating the production of carbon monoxide (CO) and methane ($CH_4$) in the case of using tantalum nitride (TaN).

FIG. 4 shows the measurement result of methane ($CH_4$), ethylene ($C_2H_4$) and ethane ($C_2H_6$) detected with the FID gas chromatograph. This FID gas chromatograph was equipped with a Porapak Q separation column. The FID gas chromatograph was programmed so as to control the valve according to a predetermined time sequence, so that $CH_4$, $C_2H_4$ and $C_2H_6$ were detected after the elapse of about 1.5 minutes, 4.5 minutes and 6.5 minutes, respectively, from the start of the measurement. As a result, voltage peaks were observed at corresponding time domains as shown in FIG. 4. This confirmed the production of $CH_4$, $C_2H_4$ and $C_2H_6$. FIG. 5 shows the measurement result of carbon monoxide (CO), etc. detected with the FID gas chromatograph. This FID gas chromatograph was equipped with a Porapak N separation column. In this case also, as with the above case, the FID gas chromatograph was programmed so as to control the valve according to a predetermined time sequence, so that CO and $CH_4$ were detected after the elapse of about 3.2 minutes and 7.2 minutes, respectively, from the start of the measurement. As a result, voltage peaks were observed at corresponding time domains as shown in FIG. 5. This confirmed the production of CO and $CH_4$.

Figure 6:
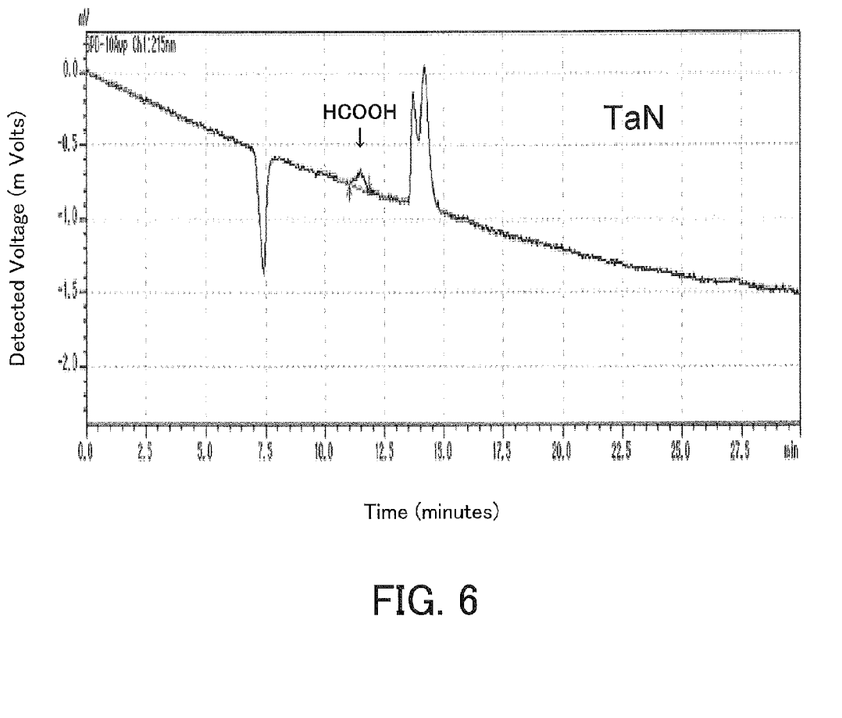
FIG. 6 is a graph showing the result of a liquid chromatographic analysis indicating the production of formic acid (HCOOH) in the case of using tantalum nitride (TaN).

FIG. 6 shows the measurement result of formic acid (HCOOH) detected with the high performance liquid chromatograph. This liquid chromatograph was equipped with a TSK-GEL SCX ($H^+$) column. The liquid chromatograph was set so that the peak of HCOOH appeared after the elapse of about 11.5 minutes from the start of the measurement. As a result, a voltage peak was observed at this time domain as shown in FIG. 6. This confirmed that HCOOH also was produced by electrolytic reduction of $CO_2$ using TaN.

As described above, the production of CO, $CH_4$, $C_2H_4$, $C_2H_6$ and HCOOH was finally confirmed based on the analysis results of the products of the catalytic reaction.

Example 2

Figure 7A:
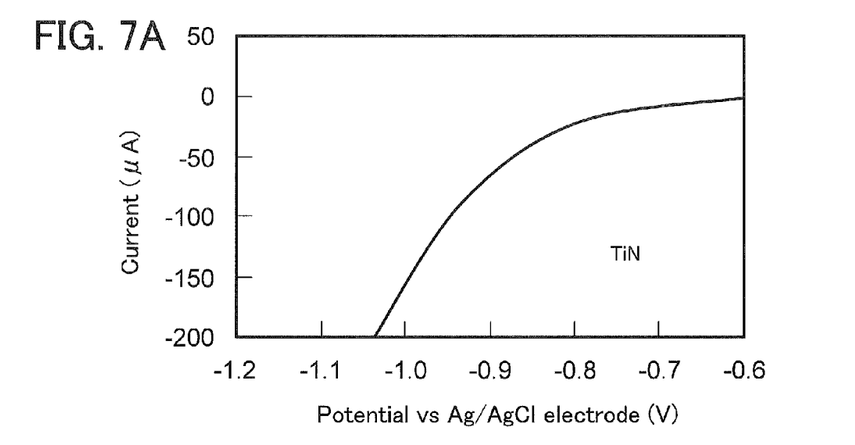
FIG. 7A to FIG. 7C are graphs showing the results of reaction current-electrolytic potential measurements (C-V measurements) in the case of using titanium nitride (TiN), molybdenum nitride (MoN+$Mo_2N$) and iron nitride ($Fe_2N$+$Fe_4N$), respectively.
Figure 7B:
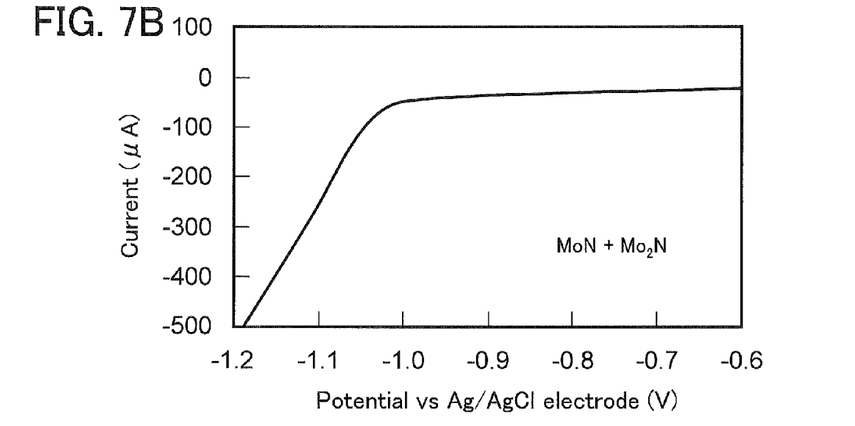
Figure 7C:
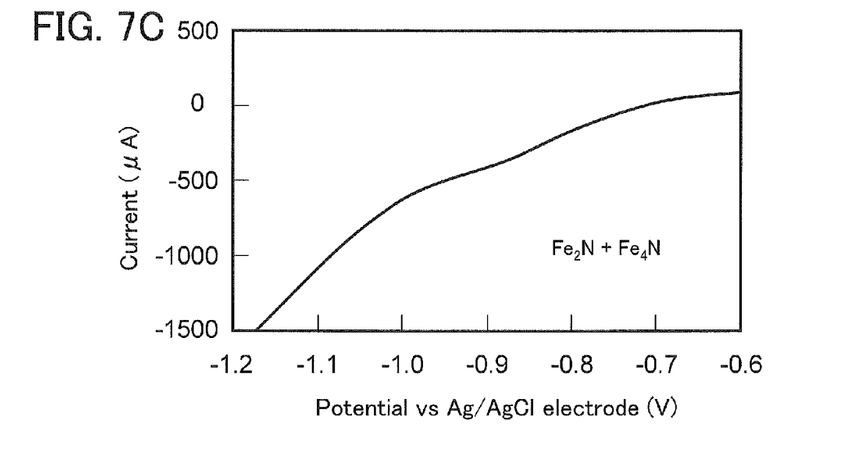

The same experiment as in Example 1 was conducted also in each of the cases where titanium nitride (TiN) was used as the catalyst for reducing $CO_2$, zirconium nitride (ZrN) was used as the catalyst for reducing $CO_2$, hafnium nitride (HfN) was used as the catalyst for reducing $CO_2$, molybdenum nitride ($Mo_2N$ and MoN) was used as the catalyst for reducing $CO_2$, and iron nitride ($Fe_2N$ and $Fe_4N$) was used as the catalyst for reducing $CO_2$. As a result, in each case, a reducing current of $CO_2$ was observed and the production of CO, $CH_4$, $C_2H_4$, $C_2H_6$, HCOOH, etc. was confirmed, which is the same as the results obtained when tantalum nitride (TaN) was used. Particularly, in the cases where TiN particles, mixed particles of MoN particles and $Mo_2N$ particles (MoN particles+$Mo_2N$ particles), and mixed particles of $Fe_2N$ particles and $Fe_4N$ particles ($Fe_2N$ particles+$Fe_4N$ particles) were used, a reducing current of $CO_2$ was observed at an overvoltage lower than that for Cu, similarly in the case of using TaN particles. FIG. 7A shows the reducing current of $CO_2$ in the case of using the catalyst containing TiN particles. FIG. 7B shows the reducing current of $CO_2$ in the case of using the catalyst containing MoN particles+$Mo_2N$ particles. FIG. 7C shows the reducing current of $CO_2$ in the case of using the catalyst containing $Fe_2N$ particles +$Fe_4N$ particles. In the case of using the catalyst containing TiN particles, the reducing current of $CO_2$ started to be observed from about −0.8 V with respect to the potential of the Ag/AgCl electrode. In the case of using the catalyst containing MoN particles+$Mo_2N$ particles, the reducing current of $CO_2$ started to be observed from about −1.03 V with respect to the potential of the Ag/AgCl electrode. In the case of using the catalyst containing $Fe_2N$ particles+$Fe_4N$ particles, the reducing current of $CO_2$ started to be observed from about −0.75 V with respect to the potential of the Ag/AgCl electrode.

Comparative Example 1

The reducing current of $CO_2$ was measured using an electrode composed only of the CP used as the electrode substrate in Example 1. The $CO_2$ reducing current was measured by the same method as in Example 1. As a result, no $CO_2$ reducing current was observed. That is, the electrode composed only of the CP was inactive in the $CO_2$ reduction. Only one product of the electrolytic reaction was hydrogen ($H_2$).

Comparative Example 2

As metal nitrides other than the metal nitrides selected in the present disclosure, vanadium (V) nitride particles, chromium (Cr) nitride particles and tungsten (W) nitride particles were produced. These nitride particles were supported on the CP used as the electrode substrate in Example 1 and used as the catalysts. The reducing current of $CO_2$ was measured using these catalysts. As a result, they exhibited the same properties as those of the CP used as the electrode substrate. That is, in the case of using the catalysts of Comparative Example 2, only $H_2$ was produced and products such as hydrocarbon and HCOOH were not obtained.

From the results above, it was confirmed that nitrides of elements selected from Ti, Zr, Hf, Ta, Mo and Fe, which are highly durable compounds, were capable of reducing $CO_2$ electrolytically at an overvoltage lower than overvoltages for conventional catalysts. Moreover, it was shown that the use of these nitrides as catalysts for reducing $CO_2$ made it possible to obtain CO, $CH_4$, $C_2H_4$, $C_2H_6$, HCOOH, etc. as products. These nitrides made it possible to reduce $CO_2$ electrolytically in an energy-saving manner, with an external DC power supply at ordinary temperature.

The catalyst used in the method for reducing $CO_2$ of the present disclosure can be used for more environmentally-friendly configurations. The method for reducing $CO_2$ of the present disclosure can be applied to methods using a solar cell as an external power supply. The catalyst for reducing $CO_2$ can be applied, by combination with a photocatalyst, to catalysts which can be used with solar energy.

Industrial Applicability

The present disclosure demonstrates that nitrides of elements selected from Ti, Zr, Hf, Ta, Mo and Fe, which are highly durable compounds, are capable of reducing $CO_2$ electrolytically at an overvoltage lower than overvoltages for conventional catalysts for reducing $CO_2$. These nitrides make it possible to produce $CH_4$, $C_2H_4$, $C_2H_6$, HCOOH, etc. from $CO_2$ with less energy. That is, the method for reducing $CO_2$ of the present disclosure can provide these useful substances from $CO_2$ at lower cost. Moreover, the $CO_2$ reduction treatment technique (the method for reducing $CO_2$ and the electrochemical cell used in the method) using these nitrides is also effective as a technique for reducing the amount of $CO_2$ against global warming. The $CO_2$ reduction treatment technique is expected to be useful as a more environmentally-friendly resource recycling method for the future if they are combined with photocatalytic technology and solar power generation technology.

What is claimed is:

1. A method for reducing carbon dioxide, the method comprising:
    a step (a) of preparing an electrochemical cell, wherein
    the electrochemical cell comprises a working electrode, a counter electrode and a vessel,
    the vessel stores an electrolytic solution,
    the working electrode contains, as a catalyst, only at least one nitride selected from the group consisting of titanium nitride, zirconium nitride, hafnium nitride, tantalum nitride, molybdenum nitride and iron nitride,
    the electrolytic solution contains carbon dioxide,
    the vessel comprises a solid electrolyte membrane,
    the solid electrolyte membrane is interposed between the working electrode and the counter electrode,
    the working electrode is in contact with the electrolytic solution, and
    the counter electrode is in contact with the electrolytic solution; and
    a step (b) of applying a negative voltage and a positive voltage to the working electrode and the counter electrode, respectively, to reduce the carbon dioxide.

2. The method according to claim 1, wherein
in the step (b), at least one compound selected from the group consisting of methane, ethylene, ethane and formic acid is produced.

3. The method according to claim 1, wherein
the electrochemical cell further comprises a tube,
one end of the tube is disposed in the electrolytic solution, and
in the step (b), the carbon dioxide is supplied to the electrolytic solution through the tube.

\* \* \* \* \*